Sept. 22, 1959 E. J. ZITKE 2,905,569
METHOD OF APPLYING PARTICLES TO A SURFACE IN PREDETERMINED
PATTERNS AND APPARATUS THEREFOR
Filed Jan. 3, 1955 3 Sheets-Sheet 1
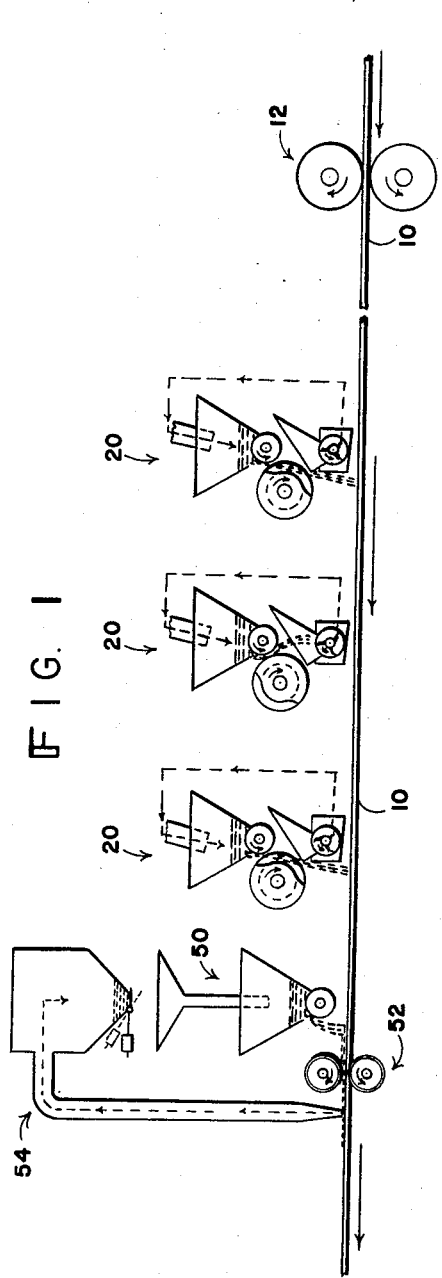
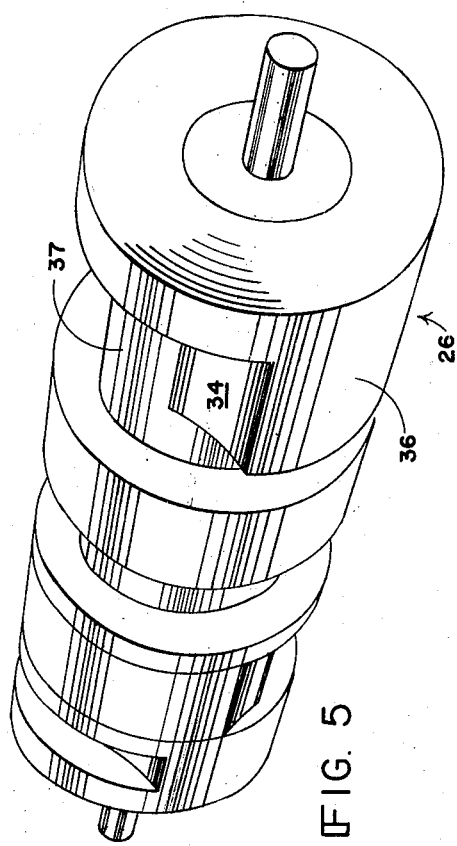
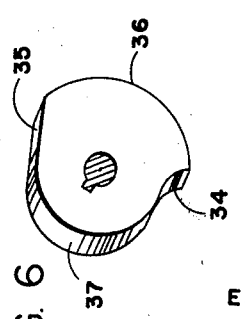
INVENTOR.
ERNEST J. ZITKE
BY William W. Ryner, Jr.

Sept. 22, 1959  
E. J. ZITKE  
2,905,569  
METHOD OF APPLYING PARTICLES TO A SURFACE IN PREDETERMINED PATTERNS AND APPARATUS THEREFOR  
Filed Jan. 3, 1955  
3 Sheets-Sheet 2
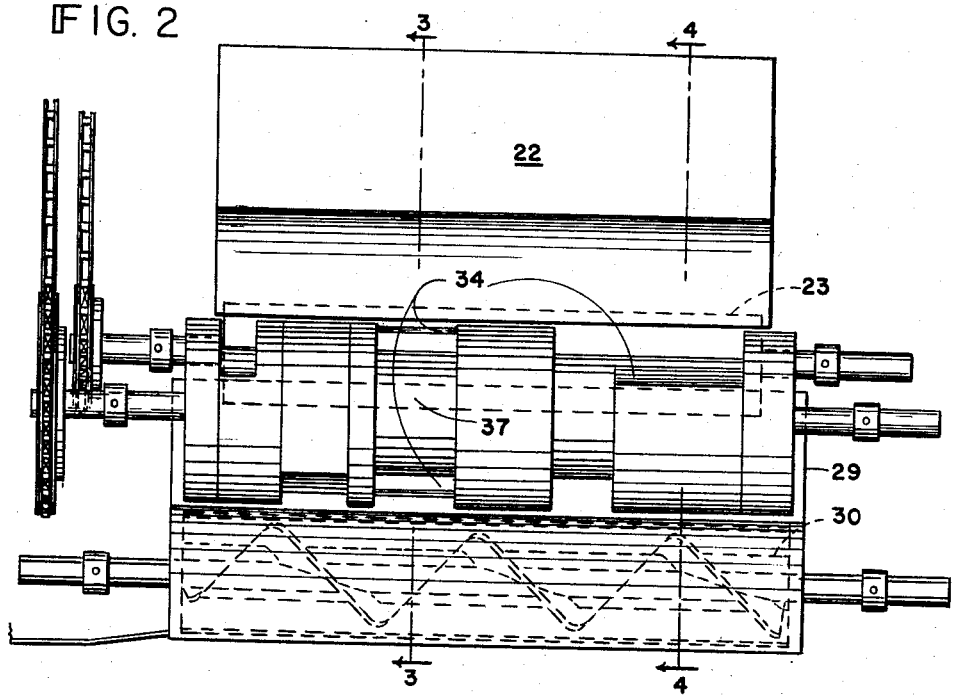
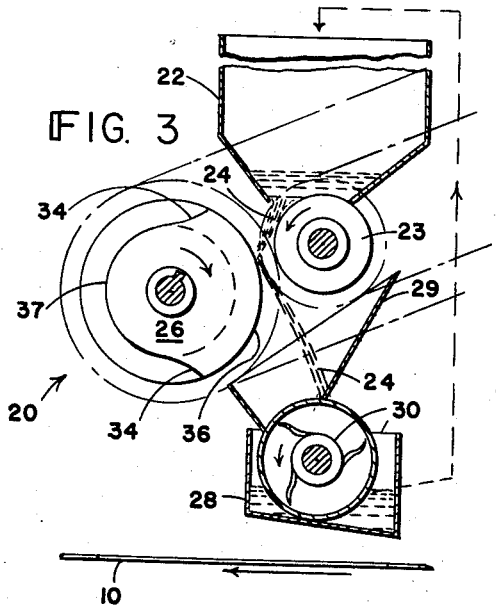
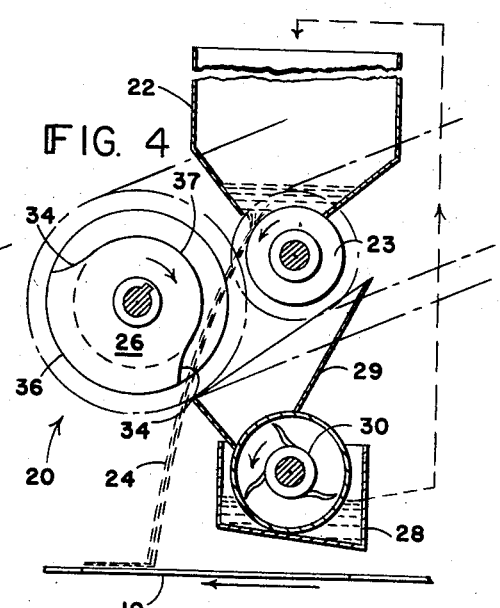
INVENTOR.
ERNEST J. ZITKE
BY
William W. Rymer, Jr.

Sept. 22, 1959 E. J. ZITKE 2,905,569
METHOD OF APPLYING PARTICLES TO A SURFACE IN PREDETERMINED
PATTERNS AND APPARATUS THEREFOR
Filed Jan. 3, 1955 3 Sheets-Sheet 3

*INVENTOR.*
ERNEST J. ZITKE
BY
*William W. Ryner, Jr.*

United States Patent Office 2,905,569
Patented Sept. 22, 1959

2,905,569

METHOD OF APPLYING PARTICLES TO A SURFACE IN PREDETERMINED PATTERNS AND APPARATUS THEREFOR

Ernest J. Zitke, Brockton, Mass., assignor to Bird & Son, Inc., East Walpole, Mass., a corporation of Massachusetts Application January 3, 1955, Serial No. 479,460

12 Claims. (Cl. 117—25)

This invention relates to a method and apparatus for depositing discrete particles accurately according to a predetermined pattern on moving surfaces. The invention is particularly useful as a means of depositing granules of one or more colors to simulate units of brick or stone in the manufacture of brick- and stone-masonry simulating siding.

A primary advantage of my new method and apparatus is that it makes possible deposit of granules or other non-liquid particles (hereinafter referred to as solid particles, and including particles having voids therein, so long as not liquid) in areas of predetermined shape with great accuracy and sharp definition, and with great freedom from carry-over of granules into areas in which they are not desired.

Another advantage of the method and apparatus is that they are especially adapted for use in laying down larger areas, such as areas simulating brick or stone, being as easily used for these larger areas as for very small ones.

A further advantage is that the inertia of starting and stopping the flow of a stream of particles, as when a gate is opened and closed, is avoided, facilitating control of the pattern and achievement of the desired sharpness of definition at area edges. Such sharpness is further facilitated by avoidance of dribble from build-up around the edges of openings in a moving stencil.

Still another advantage of my new method and apparatus is that it also makes possible the deposit of areas of granules with any desired edge or portion thereof having a reduced number of particles per square inch and shading off gradually, but accurately to any degree previously chosen.

Yet another advantage is that the granules may be directed onto the surface passing therebeneath in desired areas, and away from said surface at other areas thereof, by means which are light in weight, require little power to operate, and may be operated from a power source different than that used to recirculate any particles not directed onto the surface during any particular cycle.

Yet another advantage is that my new method and device facilitate making series of panels in which the coloring in various areas, for example, is not identical; and in fact lends itself to making the length of a cycle, before repeating begins, as great as desired.

Another advantage is that the method and apparatus lends itself easily to cutting off all flow of granules onto the surface beneath it.

Still another advantage is that granules directed onto said surface fall freely and without any obstruction in their path to impair the accuracy or smooth continuity with which they fall on said surface.

Yet another advantage is that the density of particle deposit, or number of granules per square inch of deposited surface, may be varied as desired.

Stated broadly, the invention resides in directing a continuously flowing stream of granules or particles along a trajectory toward a moving surface on which they are to be deposited according to a predetermined pattern, and moving into said continuous stream, corresponding with areas thereof on which less or no deposite of granules is desired, means for changing the direction of the stream into another path to prevent impingement on the moving surface. It will ordinarily be desirable to intercept particles moving along this diversion path, and to recycle the same.

Objects, advantages and features in addition to those referred to above will appear from the following description and from the drawings of preferred embodiments, in which:

Fig. 1 is a diagrammatic view illustrating manufacture of siding panels having on a surface thereof simulation of brick or stone masonry, making use of three units operating in accordance with the present invention;

Fig. 2 is a side elevation of a preferred embodiment of apparatus of my invention;

Fig. 3 is a diagrammatic sectional view, taken at 3—3 of Fig. 2, showing a stage of operation at which granules are being diverted from the surfaces passing therebeneath;

Fig. 4 is a similar diagrammatic sectional view, illustrating the stage of operation at which granules have just begun to flow onto the surface therebeneath;

Fig. 5 is a perspective view of a preferred cam for diverting granules from the surface passing therebeneath as desired in accordance with my invention;

Fig. 6 is an isometric view of a modified cam element in accordance with the invention, for deposit of an area having one edge sharply defined and the opposing edge gradually fading out;

Figure 7:
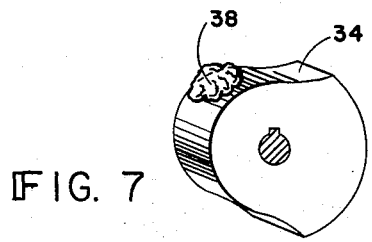
Fig. 7 is an isometric view of another modification for deposit of an area of granules except in an irregular, non-sharply defined, central portion.

Referring now in more detail to the drawings, there is shown in Figure 1 a flow sheet illustrating the manufacture of siding panels with different colors or blends of granules patterned thereon. Panels 10 are forced by push rolls 12 in the direction indicated by the arrows.

Before the panels pass beneath the three units 20 which operate in accordance with the present invention, they are given a coating of cementitious material such for example as asphalt, in the manner long familiar to the art, so that granules later falling thereon will adhere.

If it is desired to manufacture panels which simulate masonry such as brick or stone with mortar lines therebetween, these mortar line granules may if desired also be deposited before passing the panels beneath the units 20. Any suitable means may be used to deposit these granules; for example the method disclosed in Miller Patent No. 2,644,768 may be used to deposit mortar lines extending generally transversely of the direction of panel travel, and a continuously flowing distributing hopper with a nozzle of the desired width may be used to lay down granules simulating mortar lines extending in the direction of panel travel.

The panels then pass beneath three units indicated generally at 20, one for depositing each of three different colors (or blends) of granules within predetermined areas of the panels passing beneath, in accordance with the invention of the present application.

A unit 20, which is a preferred embodiment of my new apparatus, suitable for practicing my new method, is shown in more detail in Fig. 2 and, diagrammatically, in Figs. 3 and 4. A distributing hopper 22 is mounted for delivery of a continuous stream of granules 24 to fall along a trajectory which, if uninterrupted, as in Fig. 4, brings the granules to rest on the surface of a panel 10 moving therebeneath. A diversion control element, the cam 26, is mounted for rotational movement in the vicinity of said continuous stream as panels 10 move beneath the unit 20, the irregular surface of said cam is so positioned and formed that when portions of the panel surface which are not meant to be coated with granules are thereunder, said cam interjects into the normal trajectory of said granules a diversionary surface which has the effect of directing said granules away from the surface of said panel and along a second trajectory ending in receptacle 28. A plate 29 extending from said receptacle higher than the bottom of the roller 23 of the distributing hopper 22 aids in guiding the diverted granules into receptacle 28. A screw 30 and elevating means (indicated in Figs. 3 and 4, but not shown), preferably not operated by the same power source as the cam 26, return the diverted granules, which fall into said receptacle, into the respective distributing hopper 22, so that these granules may go through another cycle.

The cam 26 may suitably be fabricated from a series of cam elements, of varying peripheral configuration, mounted in side-by-side relation. The cam element illustrated in Figs. 3 and 4 is provided with two sharp cut-off surfaces 34. These surfaces are formed on an arc corresponding generally to that of the trajectory of granules passing thereby, so that substantially full rate of stream flow is maintained until the cylindrical surface of larger radius 36 moves into the granule trajectory, whereupon an immediate and total cutoff is achieved so that sharp definition of area is achieved on the panel passing therebeneath. Similarly, as the surface 36 moves out of the granule trajectory, there is a practically instantaneous change from no granule flow onto the panel to substantially full stream flow thereupon, again guaranteeing sharp area definition on the panel. The surfaces 34 join the cylindrical surface of larger radius 36 with a cylindrical surface of smaller radius 37.

A modified cam element is shown in Fig. 6, for deposit of an area of granules of a particular color in which one edge generally perpendicular to the direction of panel movement is sharply defined, but the opposing edge gradually shades off. The cam element of Fig. 6 includes one sharp cut-off surface 34, corresponding to the trajectory arc of uninterrupted granule flow and functioning as described in the preceding paragraph. Said cam element includes also a diffusing cut-off surface 35, which as the rotating element turns in operation is gradually introduced into the continuously falling stream to divert more and more of the stream away from the panel passing therebeneath, so that the area of color being laid down gradually shades off from full strength to imperceptibility.

As described in the preceding paragraph, decreased density per square inch of surface on which deposit is being made can be produced at the edges of predetermined areas to produce diffusing edges. The same principle can be applied to produce areas of reduced density or distribution of particle deposit which may be as large as desired, simply by prolonging for as long as desired interjection, only part way into the continuously flowing stream, of the diverting surface. Thus a part only of the granules which would alight on the moving surface on which deposit is being made are diverted and intercepted, reducing the number of particles per square inch thereon. Color differences may obviously be produced by thus varying density; for example if red particles are being deposited on a white cementitious material the color of the deposited area may be made to come out dark red or light red or pink. The amount of granule flow onto the moving surface being treated may be minimized to any desired extent less than full flow, to as low as zero, as described above.

Another modified cam element is shown in Fig. 7. In this embodiment, there is loacted rising from the surface of smaller radius 37 of the cam element surface, and surrounded thereby, an irregular protuberance 38, which diverts granule flow to varying degrees from the central portion of the area being deposited, producing centrally thereof a spot which is not covered by granules and with edges diffusing into said area. Granules of a different color then may be later deposited over the surface, and will adhere to the cementitious material thus left uncoated, to produce a central spot of different color, the edges diffusing irregularly (as predetermined) into the color of the main body, to produce a new and interesting appearance.

Figure 8:
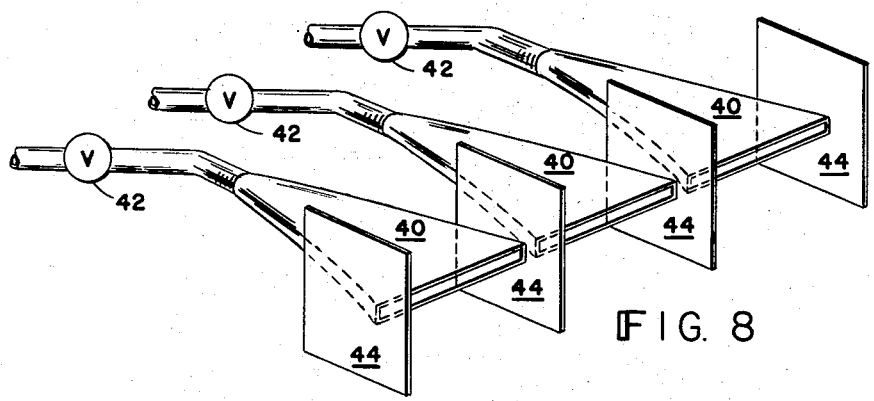
Fig. 8 is an isometric view of a modification employing air jets to divert the stream of granules when desired.
Figure 9:
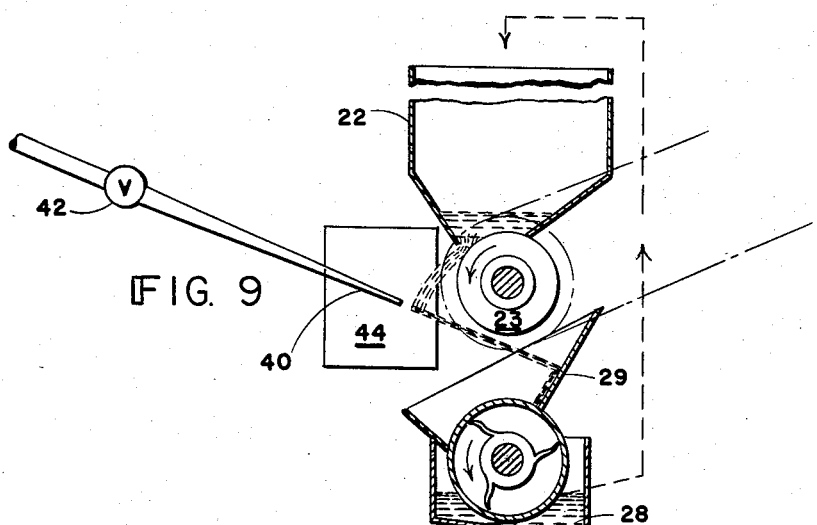
Fig. 9 is a diagrammatic view similar to Fig. 3 but with the modification of Fig. 8 shown diverting the stream of granules.

A modified embodiment of my new apparatus and process is shown in Figs. 8 and 9. In this embodiment diversion is accomplished by intermittently released jets of air, which at the appropriate times are made to blow the falling granules from their continuous flow trajectory into another path which brings them into the receptacle 28. As shown, flattened nozzles 40 blow ribbons of air onto the granules when their respective valves 42 are opened. Thin plates 44 between the nozzles 40 and extending through the continuously falling stream prevent air from any particular nozzle from interfering with the flow trajectory of the continuous stream further than desired in the direction transverse to that of panel travel therebeneath. This embodiment is more suitable for sharp cut-off edge definition than for gradual or diffusing cut-off, as will be apparent.

As stated, each unit 20 applies within areas of predetermined shape and character granules of one particular color or blend of colors. In the arrangement of Fig. 1, three units 20 are shown, but it will be apparent that as many may be used as different colors or blends are to be applied. It will also be apparent that some units may embody a diversion control means of the cam type and other units in the same overall operation may embody air jet means, or other means, or any combination of one or more diversion control means.

Following passage under all the units 20, a panel passes beneath distributing hopper 50, which deposits a continuous sheet of granules over the entire panel. This sheet acts primarily as a cushion, during passage of the panel through the press rolls 52, and thereafter the bulk of the granules deposited by the distributing hopper 50, together with any other granules not embedded in the asphalt, are returned by suction device 54 to the distributing hopper. The granules which adhere to the panels, and are embedded therein by the press rolls, are of the layer first deposited thereon, and substantially full coverage will usually be carried out by the combined effects of the mortar line depositing units used and the other area-definition deposit units 20. The granules remaining may then be more securely embedded by passing the panels 10 through further press rolls, not shown.

One very practical arrangement for production of panels having masonry-simulating areas of three different colors is to use two basic granule colors, one dark and one light, and to use as a third color a blend of the other two types. The latter blend can also be used to good effect in the distributing hopper 50, and any surpluses built up there can be routed over into the unit 20 depositing the same blend.

In addition to air and cam diversion control means as above described, other such means may be used in practicing my invention. For example, a magnetically actuated flapper might be placed for movement into and out of the normal trajectory for accomplishing the required diversion. Or diversion control means responsive to a cam through a follower might be used. Or intermittently actuated electrostatic attraction operating on the granules of the flowing stream themselves might satisfactorily accomplish said diversion.

It will be apparent that impulses for governing the opening and closing of the valves 42 of the air jet means of Figs. 8 and 9, or the creation of magnetic or electrostatic forces as referred to for the other means mentioned, may be provided for example by means of a programming device such as paper or other tape punched to take advantage of the piano roll principle, or other types of recording such as on electrical tape. Such paper or other recordings may serve as signal means, when properly energized, to provide said impulses as and when desired.

In the embodiment shown in Figs. 2, 3, and 4, the surface of larger diameter 36 of the cam 26 has a circumference equal to the length of one panel, and the cam is rotated through 360° for each panel passing thereunder. This results in repeating the overall pattern which the surface of the cam is formed to produce once for each panel, so that all the panels are identical, during any one run. It will be apparent that non-identical panels can be produced easily according to my invention by relating the cam diameter and peripheral speed to the panel speed so that there is more or less than one turn of the cam per panel. It will also be apparent that using other diversion control means, such as air blast (Figs. 8 and 9), magnetic flapper control, or electrostatic granule diversion, it will be found especially practical to make a cycle of operation of the control means, before it starts repeating itself, as long as desired, and including as many successive, non-identical panels as desired. Facility in manufacture of non-identical panels is a substantial advantage, for identical panels when laid on a wall tend to create repeating effects, such as giving the impression of a generally diagonal line going across a wall on which is laid an unbroken surface of such panels.

In order to conceal the panel nature of a wall covering, it is often desirable to place at mating ends of different panels partial masonry-simulating areas, often with wire-cut simulations running parallel to the crevice that may occur between the panels. In producing non-identical panels it might nevertheless be desirable to have all such partial areas of the same color, so as to facilitate complementing each other, near the edges thereof, but shading into other color or colors away from the panel edges, toward the longitudinally extreme ends of the overall masonry-simulating areas involved. In this case it may be preferable to use at least one unit according to the present invention in which a cam diversion control is used, for producing these panel edge deposits shading out on each side of the panel junction, and to use air or other control means for deposit of granules to define the remaining areas. The cam control means seems particularly well adapted to producing a diffusing or gradually fading out effect, as above described.

It will be fully apparent that the invention of the present patent may be used with full facility whether panels or a continuous surface such as in a roll of material are to be given a patterned deposit of discrete particles. Nor are these particles limited to mineral granules, but might be glass beads (for deposit on reflective signs), or discrete particles of pigment or resinous material (as in manufacture of patterned linoleum or other floor covering), for example. Particles of different sizes or of different materials may be placed in different units according to my invention, for deposit on different areas of the same panels, or on different panels, in the manner above described.

It will be apparent that in my new method and apparatus, all flow of particles to the surface therebeneath may easily be cut off completely for any desired period simply by interposing a thin plate to divert the entire continuous stream into the receptacle.

It will be further apparent that, if desired, granules of the continuous stream may be discharged with a very substantial non-vertical velocity. Despite any change thus produced in the particular original trajectory characteristic of the uninterrupted continuous stream, my invention remains fully applicable.

Applicant is familiar with U.S. Patent No. 2,559,543 to Muench, over which the invention, apparatus, method and advantages above described clearly distinguish.

Other advantages and embodiments not described above but within the spirit of my described invention may of course occur to those skilled in the art.

I claim:

1. The method of depositing solid particles in a predetermined pattern on a surface to be secured thereto which comprises moving said surface, discharging a continuous stream of said particles along paths impinging on said surface, and intermittently deflecting under controlled operation at least some of said particles of said stream into other courses of unsupported flight bypassing said surface, to controllably vary the quantity of particles impinging on said surface to produce patterned areas of predetermined density of particles secured to said surface.

2. The method of claim 1 in which said particles of said stream deflected to bypass said surface are caught following said other courses of unsupported flight and thereafter recycled.

3. The method of claim 1 in which the width of said stream transversely to the direction of movement of said surface is substantially greater than the thickness of said stream in said direction of movement of said surface and in which at particular portions along the width of said stream all said particles are intermittently deflected into said other courses of unsupported flight bypassing said surface, whereby said surface at certain of said areas is characterized by zero density of particles per square inch.

4. The method of claim 1 in which the width of said stream transversely to the direction of movement of said surface is substantially greater than the thickness of said stream in said direction of movement of said surface and in which at particular portions along the width of said stream a fraction only of said particles are intermittently deflected into other said courses of unsupported flight bypassing said surface, whereby said surface at certain of said areas is characterized by a diminished quantity of particles per square inch.

5. The method of claim 1 in which said step of intermittently deflecting under controlled operation at least some of said particles of said stream into other courses of unsupported flight bypassing said surface is accomplished by intermittently blowing thereagainst.

6. The method of claim 2 in which different power means are used for recycling than for deflecting particles, whereby it is possible to maintain control over the latter step with increased sensitivity and flexibility.

7. Apparatus for depositing solid particles in a predetermined pattern on a moving surface to be secured thereto which comprises a hopper for discharging said particles therefrom in a continuous stream directed toward said surface, diversion control means mounted in the vicinity of said continuous stream and adapted to intermittently deflect under controlled operation at least some of said particles of said stream into other courses of unsupported flight bypassing said surface, to controllably vary the quantity of particles impinging on said surface to produce patterned areas of predetermined density of particles secured to said surface.

8. The apparatus of claim 7 in which said diversion control means includes a deflection surface adapted to be intermittently moved into said continuous stream to deflect at least some of said particles of said stream into said other courses of unsupported flight bypassing said surface.

9. The apparatus of claim 7 in which said diversion control means includes a nozzle mounted to blow against said continuous stream and valve means for producing discharge through said nozzle responsive to signals.

10. Apparatus for depositing discrete solid particles in predetermined patterns on a moving surface which comprises a hopper for discharging said particles therefrom in a continuous stream directed toward said surface, a cam mounted for rotation in the vicinity of said continuous stream and having an irregular surface with portions thereof adapted to extend into said stream during rotation to intermittently divert at least a part of said particles of said stream corresponding to particular areas of said surface, and a receptacle for intercepting said particles so diverted.

11. The apparatus of claim 10 which includes adjacent a portion of said cam adapted to extend into said stream a face curved to conform with the trajectory of said stream and adapted to be positioned therealong, whereby in rotation of said cam from the latter position, to extend said portion into said stream, substantially instantaneous change from full flow deposit to no flow deposit is achieved.

12. The apparatus of claim 10 in which said irregular surface includes a protuberance adapted to extend into said stream.

References Cited in the file of this patent

UNITED STATES PATENTS

| | | |
|---|---|---|
| Re. 20,660 | Schacht | Feb. 22, 1938 |
| 1,471,043 | Lord et al. | Oct. 16, 1923 |
| 1,900,597 | Otis | Mar. 7, 1933 |
| 1,928,274 | Wettlaufer | Sept. 26, 1933 |
| 1,977,321 | Merritt et al. | Oct. 16, 1934 |
| 2,074,131 | Penley et al. | Mar. 16, 1937 |
| 2,081,620 | Fether | May 25, 1937 |
| 2,395,217 | Ford et al. | Feb. 19, 1946 |
| 2,559,543 | Muench | July 3, 1951 |
| 2,573,835 | Dyar | Nov. 6, 1951 |
| 2,775,532 | Sallie et al. | Dec. 25, 1956 |